Oct. 20, 1931.  C. G. KELLER  1,827,793
VEHICLE WHEEL
Filed April 5, 1929  2 Sheets-Sheet 2
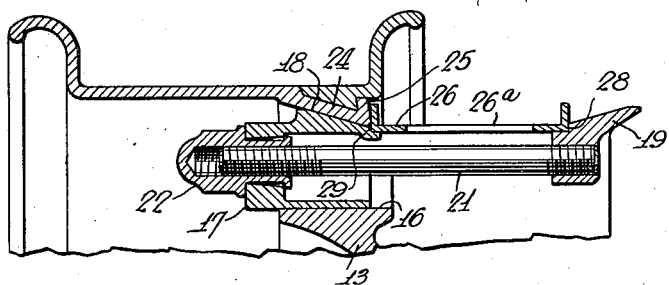
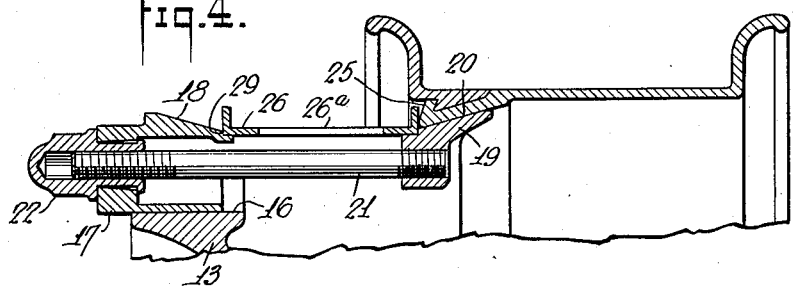
INVENTOR
Charles G. Keller
BY
ATTORNEYS Patented Oct. 20, 1931

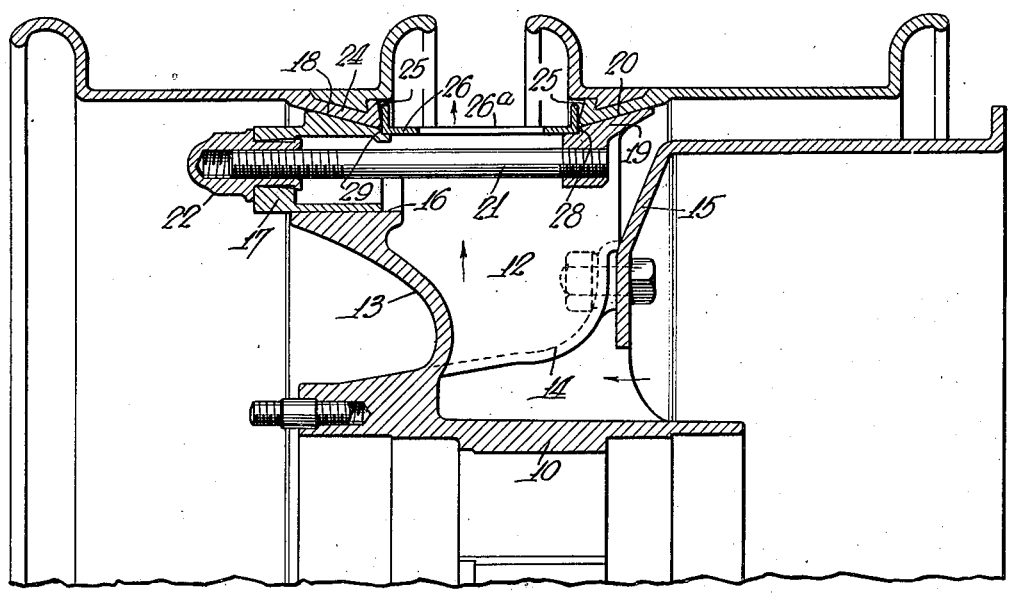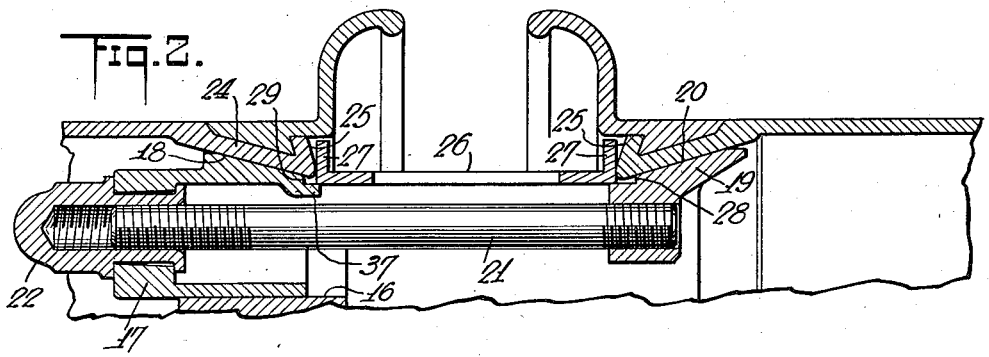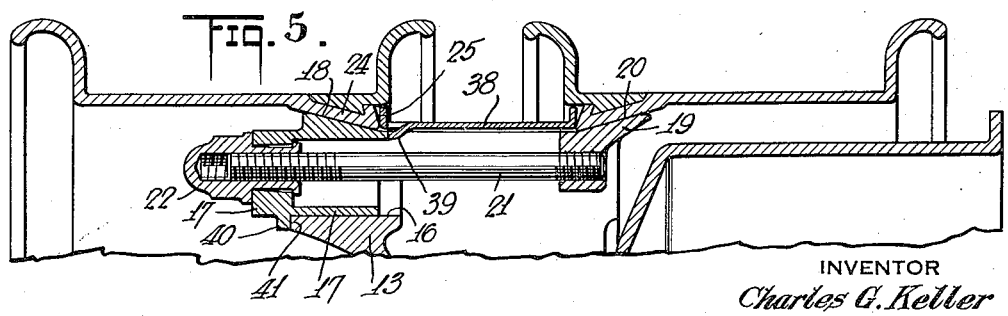

1,827,793

UNITED STATES PATENT OFFICE

CHARLES G. KELLER, OF POUGHKEEPSIE, NEW YORK

VEHICLE WHEEL

Application filed April 5, 1929. Serial No. 352,625.

In many common types of vehicle wheels having removable tire carrying rims, the rims are secured in place by wedge action and by pressure applied axially at a plurality of spaced points along the rims. In such constructions it is very difficult to secure the rim in place at exact right angles to the axis of the wheel. Any lack of proper alignment of the rim causes objectionable friction and wear on the tire surface with the road surface.

In clamping the rim in place it is customary to tighten each of the several clamping bolts or nuts a little at a time and in succession in an effort to get the rim properly aligned, but even with such precautions which are often not observed the rim will be more or less askew in respect to the axis of rotation.
One object of my invention is to insure the accurate aligning of a standard rim on the wheel without the necessity for any special construction of or attachment to the rim.
A further object of my invention is to secure a single bevel rim on a continuous or interrupted inclined supporting surface by a predetermined draw or forcing of rim axially as distinguished from the usual variable draw or forcing which may be greater at one point than it is at another point around the periphery of the rim.

As one important feature of my invention I provide means for limiting the axial movement of each rim clamping member at a predetermined position so that each member may be separately forced to its limit position, and when all are in their respective limit positions, the rim will be firmly secured in place and its position in a plane at right angles to the axis of the wheel will be insured.

My invention, broadly considered, is applicable to both single and double tired wheels.

As a further important feature of my invention I provide an annular rim spacer for use in double tired wheels and which will positively insure the proper aligning of both rims as well as the proper spacing thereof.

As a further feature I provide a rim clamping member for use with single or double tired wheels carrying standard rim or rims and which is so designed that its clamping movement is limited to a predetermined position which will give a predetermined draw to the rim and an effective clamping action.

Other objects, advantages and important features will be apparent from the specific constructions shown in the accompanying drawings or will be pointed out hereinafter.

In these drawings:

Fig. 1 is a longitudinal section in a radial plane through a portion of a wheel embodying my invention, the rims being clamped in place;

Fig. 2 is a section similar to a portion of Fig. 1, but on a larger scale and showing the parts in the position they occupy before the final clamping action;

Fig. 3 is a section similar to Fig. 1, but showing the wheel provided with only the outer rim;

Fig. 4 is a section similar to Fig. 3, but showing the wheel provided with only the inner rim; and Fig. 5 is a section similar to Fig. 1, but showing an alternative construction.

In the construction illustrated in Figs. 1 to 5 inclusive there is employed a rim clamping means, certain features of which are not claimed herein, but are claimed in copending applications Serial No. 182,199, filed April 9, 1927, and Serial No. 272,404, filed April 24, 1928. There is also illustrated a wheel construction wherein automatic air circulation is effected for cooling the brake drum, tires, etc. These features are not claimed herein, but are claimed in my copending application Serial No. 154,092, filed December 11, 1926.

In this construction the body of the wheel is of spider or fellyless type and is provided with a hub 10 and a series of spokes cast integral therewith. Each spoke is substantially U-shaped in cross-section and has side walls 12 and a connecting wall 13. Between adjacent spokes is a web 14 to which the brake drum 15 may be secured. Each spoke at its outer end has an axially extending, approximately semi-cylindrical guideway or groove 16 within which is slidably mounted a rim clamping lug 17 presenting an inclined surface or rim seat 18 for supporting one rim. Each spoke at the opposite edge and at its outer end, has a transverse wall or rim support 19 presenting an inclined surface or rim seat 20 for supporting another rim. The wall or bridge piece 19 carries a bolt or stud 21 which extends parallel to the axis of the wheel, through the groove or guideway 16, and through the clamping lug 17. A nut 22 at the outer end of this bolt 21 serves to force the clamping lug 17 inwardly to bring the inclined surfaces 18 and 20 toward or away from each other.

Two standard rims of the single bevel type are employed, each having an inwardly extending projection 24 presenting an axially facing shoulder 25 and an inclined surface. One rim is seated with its inclined surface on the corresponding inclined surface of the rim support 19 and the other is in reverse position and on the inclined surface 18 of the other rim support comprising the clamping lug 17. Between the two rims is an annular spacing member 26 which is preferably provided with square corners and also with apertures 26a registering with the passages through the spokes so that air may enter each spoke at the inner edge of the brake drum flange and pass outwardly through the spokes and between the rims for carrying the tires, by forced air circulation when the wheel is rotated.

The details of the parts so far described may be varied within comparatively wide limits. The rims themselves form no portion of my invention. Those illustrated are standard Goodyear rims, although other makes may be used.

In carrying out my invention I so proportion the parts that the rims when forced to final position on the seating surfaces of the rim supports will be tightly held in position and in alignment in a plant at right angles to the axis of the wheel.

Each rim seat member 19 is provided with a square shoulder 28 and each rim seat member 17 is provided with a square shoulder 29. The spacing ring 26 is provided with flanges 27 including edge portions which may abut against these shoulders 28 and 29, and angle portions which may abut against the shoulders 25 of the rims.

The annular rim seats 18 and 20 which are shown as being interrupted and made up of sections on the ends of separate spokes, but which in some constructions might be continuous, are so positioned in respect to the axis of the wheel and the diameter of the projections 24 on the rims that when the rim is forced axially to such a distance that it is effectively clamped in place, the shoulders 25 on the rims will be in the same transverse planes as the shoulders 28 and 29 at the inner ends of the rim seats. In other words, the parts are so proportioned that when the rims can be forced axially until their shoulders 25 are in the planes of the rim seat shoulders and when they are forced axially to that extent, efficient clamping action results.

In assembling the parts, the rims, seats and spacer have approximately the relative positions shown in Fig. 2. The spacer holds the rims a predetermined distance apart and in parallelism. As the nuts 22 are tightened the rim seats 18 wedge under the outer rim to clamp the latter and the spacer 26 forces the inner rim to the rim seat 20. The operator can tighten up one nut at a time to the final or limiting position which is determined by the spacer abutting against the shoulders 28 and 29. No further forcing action is possible and each nut may be tightened to its corresponding limiting position. When all of the nuts are tightened to their limiting positions the rims will be not only parallel to each other, but will be in planes at right angles to the axis of the wheel because all of the shoulders 28 which are fixed parts of the wheel are in a predetermined plane. It is not necessary to tighten the nuts in succession a little at a time as is required in ordinary constructions.

The spacing ring thus serves to force the rims onto their seats, space the rims so that they will be in true parallelism, and to line up the rims in planes at right angles to the axis of the wheel by reason of the abutment of the ring against the fixed and non-adjustable shoulders 28. The spacing ring also accurately defines the final position of each clamping lug 17.

As a further advantage of the construction above described, either rim may be omitted if desired or in case of emergency without effecting the clamping action of the other. In Fig. 3 I have illustrated the same wheel as is shown in Figs. 1 and 2, but have omitted the inner or right hand rim. It will be noted that the spacer may slide freely into contact with the shoulders 28 and this will insure the left hand edge of the spacer being in a plane at right angles to the axis of the wheel. As the several nuts are tightened the left hand rim will be clamped in place just as effectively as though the other rim were present. In Fig. 4 I have shown the same wheel, but with the outside or left hand rim omitted. It will be noted that in tightening the nuts 22 the lugs 17 will freely slide beneath the outer edge of the spacer until the shoulders 29 abut against the edge of the spacer, and upon further tightening the spacer will force the inner rim to its final position. Thus with the same wheel construction I may mount two rims in axially spaced relationship or may omit either rim, or may mount a single rim in a central position, all retaining the rims with a predetermined draw.

In the construction illustrated the movable rim seat member 17 is provided with a lug 37 which extends along the inner surface of the spacing ring 26. This lug serves to hold the rim seat member against movement under strain radially of the wheel. This is particularly important where the outer rim is omitted as shown in Fig. 4.

In the construction above referred to the spacing ring 26 has right angle flanges 27 which serve a double function. They engage the rims to effect relative axial movement of the rims and rim seat members to final seating position and they also engage the shoulders 28 and 29 to insure alignment and limit the clamping movement.

The same result may be obtained in other ways. For instance, in Fig. 5 I have shown a construction in which the wheel itself is substantially identical with that above described except for the limiting shoulders. The rims are spaced apart by a spacing ring 38 which is of substantially the same internal diameter as the rim projections. It may or may not have side flanges. The rim is provided with a lug 39 which is struck down therefrom into the path of movement of the combined clamping and rim seating member 17, the design and relative proportioning of the parts being such that when the rim has been forced up to seat to final position, the lug 39 on the rim clamping member will engage the shoulder formed at the end of the rim clamping member. A lug similar to the lug 39 may be employed adjacent to the opposite edge for engaging a shoulder part on the rim supporting member 19, and in that event, the wheel may be used for carrying either rim independently of the other in the same way as is shown in Figs. 3 and 4. The limiting shoulder may be the outer side of the spoke 13. As illustrated the lug clamping member 17 has a projection 40 which engages a shoulder 41 on the outer surface of the spoke. It will be noted that this projection is so located that it will come into operation and limit further movement of the clamping member when the spacing ring 38 has forced the inner rim to seating position and the shoulder on the clamping member has engaged the lug 39. It will thus be seen that instead of having both position limiting shoulders at the inner ends of the rim seats, they may both be on the movable rim seat member 17. Other constructions might be employed for accomplishing the same result with double rimmed wheels.

Although my invention involves certain important details of construction it also involves as the main feature means for securing true and square alignment of one or more rims on a wheel by means of a predetermined amount of draw on the rims and a predetermined and limited movement of the rim clamping members. The seat or seats on the wheel are made enough larger than the corresponding over-all dimensions of the rim so that such distortion of the rim will take place during the limited forcing movement to effectively clamp the rim. Where the rim seats on the wheel are interrupted rather than continuous the endwise forcing of the rim onto the seats may make the rim slightly polygonal rather than truly circular, but this slight distortion does not objectionably effect the circular character of the periphery of the tire and it does materially aid in resisting tendency of the rim to creep.

Having thus described my invention, what I claim as new and desire to secure by Letters Patent is:

1. A double tired vehicle wheel having a pair of oppositely inclined rim seats movable axially relatively to each other and each having a shoulder at the end thereof nearest to the axis of the wheel, rims supported on said seats, and an annular spacer engaging said shoulders and also engaging said rims to hold the latter on said seats, the engagement of the spacer with the shoulders serving to hold the rims in true aligned positions in planes at right angles to the axis of the wheel.

2. A vehicle wheel having a pair of oppositely inclined rim seats adjustable axially relatively to each other and shoulders at the ends of said seats nearest to the axis of the wheel, a pair of rims each having an inclined surface and an axially facing shoulder, said rims being supported on said seats with said second mentioned shoulders adjacent to said first mentioned shoulders, and an annular spacer between said rims and engaging all of said shoulders to hold the rims on the seats and to hold them with their medial planes parallel and at right angles to the axis of the wheel.

3. A vehicle wheel having a pair of oppositely inclined rim seats, one stationary and the other movable, each of said seats presenting a shoulder, and a rim spacer engaging both of said shoulders in all operative positions of the spacer and limiting the movement of the movable seat toward the stationary seat, whereby said spacer may serve to hold a pair of rims on said seats, or a single rim upon either seat.

4. A dual tired vehicle wheel having a plurality of circumferentially spaced stationary inclined rim seats for one rim, a plurality of circumferentially spaced inclined movable rim seats for another rim, and each having a shoulder at the end thereof nearest to the axis of the wheel, an annular rim spacer between said seats and adapted to engage said shoulders and to abut both rims for holding the rims in parallelism, means for forcing said rims and spacer axially to force the rims outward radially on their inclined seats, and radially inward between the seats and shoulders for definitely limiting the axial movement of the movable rim seats in respect to the stationary rim seats, whereby both rims are distorted to a predetermined extent and are clamped on their seats and in planes at right angles to the axis of the wheel.

5. A dual tired vehicle wheel having an annular series of circumferentially spaced pairs of oppositely inclined rim seats, one fixed and the other axially movable, a pair of rims, one on said fixed seats and the other on said movable seats, each rim presenting an axially facing shoulder, an annular spacer axially abutting said shoulders for holding said rims in parallelism, means for forcing said rims and spacer axially to force the rims outward radially on the seats and radially inward between the seats, stops on said movable rim seats for engaging said spacer and limiting the axial movement of said movable rim seats in respect to said spacer, and stops for limiting the extent to which the spacer may be forced axially with said movable rim seats, whereby said rims are distorted to a predetermined extent and are held parallel and in true planes at right angles to the axis of the wheel.

6. A dual tired vehicle wheel having a pair of oppositely inclined rim seats movable axially relatively to each other, and each having a shoulder at the end thereof nearest to the axis of the wheel, said seats being adapted to support separate rims thereon, an annular spacer engaging said shoulders to hold the rims in true aligned positions in planes at right angles to the axis of the wheel, and adapted to engage the rims to hold the latter on said seats.

Signed at New York, in the county of New York and State of New York, this 1st day of April, A. D. 1929.

CHARLES G. KELLER.